Patented Oct. 25, 1932

1,884,776

UNITED STATES PATENT OFFICE

HERBERT AUGUST LUBS AND ARTHUR LAWRENCE FOX, OF WILMINGTON, DELAWARE, ASSIGNORS TO E. I. DU PONT DE NEMOURS & COMPANY, OF WILMINGTON, DELAWARE, A CORPORATION OF DELAWARE

MANUFACTURE OF 6-CHLOR-O-TOLUIDINE

No Drawing.  Application filed October 3, 1931. Serial No. 566,798.

This invention relates to the production of 6-chlor-o-toluidine. There have been a number of proposed methods of producing this compound, most of which are extremely difficult to operate and afford but poor yields. There are, in fact, only two methods which are to any degree practical. These are, first, using 2.6-dinitro-toluene as a starting material and thereafter partially reducing in order to effect the reduction of one nitro group. This method is not commercial, however, since 2.6-dinitro-toluene is not commercially available and the partial reduction of one nitro group to the exclusion of the other must necessarily be followed by a diazotization which is an expensive operation.

The other method comprises the chlorination of o-nitro-toluene and thereafter separating out the 6-chlor-2-nitro-toluene. This process is subject to the criticism that the yields are low and the freezing out process requires a great deal of time, in some instances months, to complete the separation. The method is, therefore, of no commercial value for the preparation of 6-chlor-o-toluidine.

Our invention has for an object the preparation of this amine by a process which proceeds smoothly and which produces 6-chlor-o-toluidine in a very pure state and in excellent yields. Other objects will appear as this description proceeds.

We find it advantageous to chlorinate o-nitro-toluene at moderate temperatures, say from 20 to 60° C., and to use antimony pentachloride as a carrier in the chlorination. We prefer to make no attempt to separate the mixed nitro chloro toluenes thus formed, but proceed to reduce the mixed nitro-chlor toluenes and thereafter effect the separation of the chlor-toluidines.

By way of illustration we append the following example, it being understood that the proportions and conditions given are solely by way of illustration and not by way of limitation of our invention:

Example 250 grams mixed 4-chlor and 6-chlor-o-nitro toluenes prepared by the chlorination of o-nitro-toluene were gradually run into a 5 l. flask fitted with an efficient stirrer, and a reflux condenser, said flask containing 750 grams iron filings, 700 cc. water and 30 cc. formic acid. This was heated to the boil before the addition of the mixed chlor-o-nitro-toluenes was made and the addition was made at such a rate that the mixture was kept under continuous reflux without using external heat. When all the oil was added the flask was heated one hour and then treated with 175 cc. 40% solution of $Na_2S.9H_2O$ and steam distilled. The mixed chlor-o-toluidines were separated in a separatory funnel.

284 grams of these mixed amines were dissolved in 1500 cc. hot water containing 175 cc. conc. hydrochloric acid. When complete solution had occurred it was allowed to cool, the temperature being reduced to 10° C. The hydrochloride of 6-chlor-o-toluidine was then filtered off and is quite pure enough for most purposes. It may be further purified by a second recrystallization from water and yields an exceptionally pure product. The free base may be obtained by dissolving the crystals of hydrochloride in water and thereafter making the solution alkaline. The free toluidine separates out as an oil which may be dried and distilled to further purify it. The 6-chlor-o-toluidine formed by this process possesses a constant boiling point of 245° C. at atmospheric pressure and boils practically with no decomposition. The acetyl derivative melts at 154° C. in accordance with the literature.

By our process between 60 and 65% of the ortho-nitro-toluene originally employed will be converted to 6-chlor-o-toluidine. The manner of conversion, as is apparent, is simple and inexpensive in contra-distinction with the prior art processes which were slow, difficultly controlled, and expensive, and which gave exceedingly low yields.

Since many embodiments of this invention, differing widely in one or more respects, may be made without departing from the spirit of our invention, it is to be understood that we do not limit ourselves to the foregoing examples or description except as indicated in the following claims:

We claim:

1. The process of producing 6-chlor-o-toluidine, which comprises chlorinating o-nitrotoluene, thereafter reducing to toluidines the mixed chlor-nitro-toluenes thus formed, dissolving the said toluidines in hot aqueous hydrochloric acid, cooling the solution, and separating the 6-chlor-o-toluidine-hydrochloride which crystallizes out of the cooled solution.

2. The process of producing 6-chlor-o-toluidine, which comprises chlorinating o-nitrotoluene, reducing to toluidines the mixed chlor-nitro-toluenes thus formed, dissolving the said toluidines in a hot hydrochloric acid solution, cooling the said solution to about 10° C., separating the crystalline 6-chlor-o-toluidine hydrochloride which crystallizes out, dissolving the said hydrochloride in water and making the solution alkaline, and thereafter separating off the free 6-chlor-o-toluidine.

3. In the process of producing 6-chlor-o-toluidine, the steps which comprise separating 6-chlor-o-toluidine from a mixture of chlor-o-toluidines by dissolving the said mixture in hot aqueous hydrochloric acid, cooling the acid solution, and thereafter separating the 6-chlor-o-toluidine hydrochloride which crystallizes out.

4. In the process of producing 6-chlor-o-toluidine, the steps which comprise separating 6-chlor-o-toluidine from a mixture of 6-chlor-o-toluidine and 4-chlor-o-toluidines by dissolving the said mixture in a hot hydrochloric acid solution, cooling the said acid solution to about 10° C., separating the crystalline 6-chlor-o-toluidine hydrochloride which crystallizes out, dissolving the said hydrochloride in water and making the solution alkaline, and thereafter separating off the free 6-chlor-o-toluidine.

In testimony whereof we affix our signatures.

HERBERT A. LUBS.
ARTHUR L. FOX.